United States Patent
Matsui (10) Patent No.: US 7,636,122 B2
(45) Date of Patent: Dec. 22, 2009

(54) FOCUS CONTROL APPARATUS FOR AUTO-FOCUSING ON A SUBJECT IN AN AREA SPECIFIED WITHIN A RANGE OF A CAMERA IMAGE PICKED UP BY A TELEVISION CAMERA

(75) Inventor: Nobuo Matsui, Saitama (JP)

(73) Assignee: Fujinon Corporation, Saitama-shi (JP)

( * ) Notice: Subject to any disclaimer, the term of this patent is extended or adjusted under 35 U.S.C. 154(b) by 670 days.

(21) Appl. No.: 11/192,080

(22) Filed: Jul. 29, 2005

(65) Prior Publication Data

US 2006/0033834 A1 Feb. 16, 2006

(30) Foreign Application Priority Data

Aug. 10, 2004 (JP) ............................. 2004-233481
Apr. 7, 2005 (JP) ............................. 2005-111269

(51) Int. Cl.
*H04N 5/232* (2006.01)
*G03B 13/00* (2006.01)
*G02B 15/14* (2006.01)
*G03B 3/00* (2006.01)

(52) U.S. Cl. .................. 348/345; 359/694; 396/137
(58) Field of Classification Search ......... 348/345–356; 396/72, 76, 79, 82, 84, 85, 125, 127, 137; 359/626, 694, 696–698, 705–706, 822–825
See application file for complete search history.

(56) References Cited

U.S. PATENT DOCUMENTS 6,812,968 B1* 11/2004 Kermani ..................... 348/345
6,853,502 B2* 2/2005 Sasaki ........................ 359/698
2002/0039242 A1* 4/2002 Sasaki et al. ................ 359/819
2003/0174414 A1* 9/2003 Sasaki ........................ 359/698
2004/0246365 A1* 12/2004 Hirai .......................... 348/369
2006/0023110 A1* 2/2006 Sasaki et al. ................ 348/349

FOREIGN PATENT DOCUMENTS

| JP | 1-253016 | 10/1989 |
| JP | 2000-115622 | 4/2000 |
| JP | 2002-365519 | 12/2002 |
| JP | 2003-279832 | 10/2003 |
| JP | 2004-117492 | 4/2004 |

OTHER PUBLICATIONS

Office Action dated Mar. 13, 2008 for corresponding Japanese Application No. 2005-111269 and English translation thereof.

* cited by examiner

*Primary Examiner*—Kelly L Jerabek
(74) *Attorney, Agent, or Firm*—Harness, Dickey & Pierce, P.L.C.

(57) ABSTRACT

The present inention proides a focus control apparatus for a television camera comprising a focus adjusting portion for manual focus adjustment of the television camera, an indicating member for use to specify an area desired to be brought into focus within a range of a camera image being picked up by the television camera, an area display deice which displays position of the area specified with the indicating member, on a camera screen and a switch which outputs a command signal to auto-focus on a subject in the area specified with the indicating member, wherein the indicating member and the switch are positioned such that the indicating member and the switch can be operated simultaneously with the focus adjusting portion by the same hand.

3 Claims, 9 Drawing Sheets

FOCUS CONTROL APPARATUS FOR AUTO-FOCUSING ON A SUBJECT IN AN AREA SPECIFIED WITHIN A RANGE OF A CAMERA IMAGE PICKED UP BY A TELEVISION CAMERA

BACKGROUND OF THE INVENTION

1. Field of the Invention

The present invention relates to a focus control apparatus. More particularly, it relates to a focus control apparatus which allows an area desired to be brought into focus to be specified within a range of a camera image being picked up by a television camera and auto-focuses on a subject in the area.

2. Related Art

The present applicant has proposed, in Japanese Patent Application Laid Open No. 2004-117492, a television camera system which allows an AF area desired to be brought into focus to be specified in a viewfinder screen within a range of a camera image being picked up by a broadcast camera and auto-focuses on a subject in the AF area.

In the television camera system, a joystick and the like used to superimpose an AF frame on the viewfinder screen and move the AF frame to a specified position of the AF area is cited as an AF area specifying device for use to specify an AF area in the viewfinder screen. When a cameraperson presses a switch after specifying an AF area with the joystick, the autofocus function comes into action to focus on the subject in the AF area automatically.

Incidentally, as described in Japanese Patent Application Laid Open No. 2003-279832, broadcast cameras are usually used being mounted on a pan head attached to a pedestal dolly or tripod. The cameraperson points the broadcast camera in a desired direction through pan and tilt operations by gripping two panrods, adjusts focal length by manually operating a zoom demand mounted on one of the two panrods, and adjusts focus by manually operating a focus controller mounted on the other panrod.

In the case of a broadcast camera equipped with the joystick and focus controller for use to specify an AF area, the cameraperson first specifies an AF area with the joystick, brings the AF area into approximate focus by manually operating the focus controller, and then automatically brings the AF area into perfect focus by operating the switch.

SUMMARY OF THE INVENTION

As described above, to specify an AF area and adjust focus in a broadcast camera equipped with a joystick and focus controller, the cameraperson must operate the joystick, focus controller, and switch. However, on conventional broadcast cameras, the joystick, focus controller, and switch are not laid out properly by giving due consideration to convenience for their operations carried out in sequence. Consequently, the cameraperson cannot perform the sequence of operations smoothly.

The present invention has been made in view of the above circumstances and has an object to provide a focus control apparatus for a television camera which makes it possible to specify an area and adjust focus smoothly in a television camera equipped with an indicating member for use to specify an area desired to be brought into focus within a range of a camera image being picked up by the television camera, a focus adjusting portion for use to manually bring a subject in the area close to focus, and a switch for use to auto-focus on the subject in the area subsequently.

To achieve the above object, according to a first aspect of the present invention, there is provided a focus control apparatus comprising a focus adjusting portion for manual focus adjustment of the television camera, an indicating member for use to specify an area desired to be brought into focus within a range of a camera image being picked up by the television camera, an area display device which displays position of the area specified with the indicating member, on a camera screen, and a switch which outputs a command signal to auto-focus on a subject in the area specified with the indicating member, wherein the indicating member and the switch are positioned such that the indicating member and the switch can be operated simultaneously with the focus adjusting portion with one hand.

According to the first aspect, since the indicating member and switch are placed near the focus adjusting portion so that they can be operated manually while manually operating the focus adjusting portion at the same time, the cameraperson can specify an area and adjust focus without taking his/her hand off the focus adjusting portion. This makes it possible to specify an area and adjust focus smoothly.

In addition to the indicating member according to the present invention, available area specifying devices include a dial knob used to specify vertical and horizontal coordinates of an area and a track ball used for a mouse. However, two fingers—the thumb and index finger—are usually needed to operate a dial knob, and thus it is difficult to operate the knob simultaneously with the focus adjusting portion. Also, a track ball requires encoders to be placed around it in order to detect vertical and horizontal positions. This increases the overall size of the track ball, making it difficult to place the track ball near the focus adjusting portion. Consequently, it is difficult for the cameraperson to operate the track ball without taking his/her hand off the focus adjusting portion.

Unlike these area specifying devices, the indicating member can be easily operated simultaneously with the focus adjusting portion with one hand because it is designed to be operated via a lever with a thumb alone. Also, the indicating member, which consists of an indicating member body with built-in encoders, is smaller than a track ball which requires installation space for encoders, and thus is easier for the cameraperson to operate.

According to a second aspect of the present invention, in the focus control apparatus according to the first aspect, the indicating member comprises: an indicating member body which outputs a signal corresponding to a swing motion of a lever of the indicating member; a casing which houses the indicating member body, makes the lever stick out, and has an opening to permit the swing motion of the lever; a sliding member which covers the opening in the casing, has a hole for the lever to pass through, and slides between the casing and the indicating member body along with movement of the lever; and a friction member which gives a predetermined frictional force to the sliding member, being mounted on the casing and placed in contact with the sliding member.

Many of indicating members used as area specifying devices are a center return type. Therefore, as the cameraperson lifts his/her thumb off the lever of the indicating member after specifying an area, the lever automatically returns to the center. This can cause a deviation in the specified area. To deal with this problem, according to the second aspect, the sliding member and friction member are mounted on the indicating member to brake the sliding member by the frictional resistance between the sliding member and friction member, and thereby prevent the lever from deviating from its course. This makes it possible to prevent deviation of the area specified with the indicating member. Besides, since the indicating member body contains encoders and other electrical components which do not like dust and water droplets, it is necessary to prevent intrusion of dust and water droplets into the indicating member body. According to the second aspect, since the opening in the casing through which dust and water droplets can intrude is normally covered by the sliding member, no dust or water droplet will intrude the indicating member body.

According to a third aspect of the present invention, in the focus control apparatus according to the first or second aspect, a knob with an approximately flat concave spherical top face or a flat top face is attached to the lever of the indicating member.

Typical indicating members, which have a spherical knob on the lever, are disadvantageous in that a thumb operating the knob tends to slip over the spherical surface, thus making it difficult to specify an area in a stable manner. When the knob has an approximately flat concave spherical top face or a flat top face as with the third aspect, the side of the thumb contacts the top face of the knob more closely, making it possible to specify an area in a stable manner.

According to a fourth aspect of the present invention, there is provided a focus control apparatus comprising a focus adjusting portion for focus adjustment of the television camera, an indicating member for use to specify an area desired to be brought into focus within a range of a camera image being picked up by the television camera, an area display device which displays position of the area specified with the indicating member, on a camera screen, and a switch which outputs a command signal to auto-focus on a subject in the area specified with the indicating member, wherein the switch is a switch mechanism which outputs the command signal when a lever of the indicating member is pressed.

It is more preferable to combine the focus adjusting portion, indicating member, and switch than to mount them separately because a sequence of operations can be performed at once. Thus, according to the fourth aspect, the lever of the indicating member incorporates a switch function and outputs a command signal when the lever is pressed. Consequently, the cameraperson can press the lever without lifting his/her thumb off the lever after specifying an area by moving the lever, and thus can perform a sequence of operations at once.

With the focus control apparatus according to the present invention, since the indicating member and switch are placed near the focus adjusting portion so that they can be operated manually while manually operating the focus adjusting portion at the same time, the cameraperson can specify an area and adjust focus without taking his/her hand off the focus adjusting portion. This makes it possible to specify an area and adjust focus smoothly.

DETAILED DESCRIPTION OF THE PREFERRED EMBODIMENTS

A preferred embodiment of a focus control apparatus according to the present invention will be described below with reference to the drawings.

Figure 1:
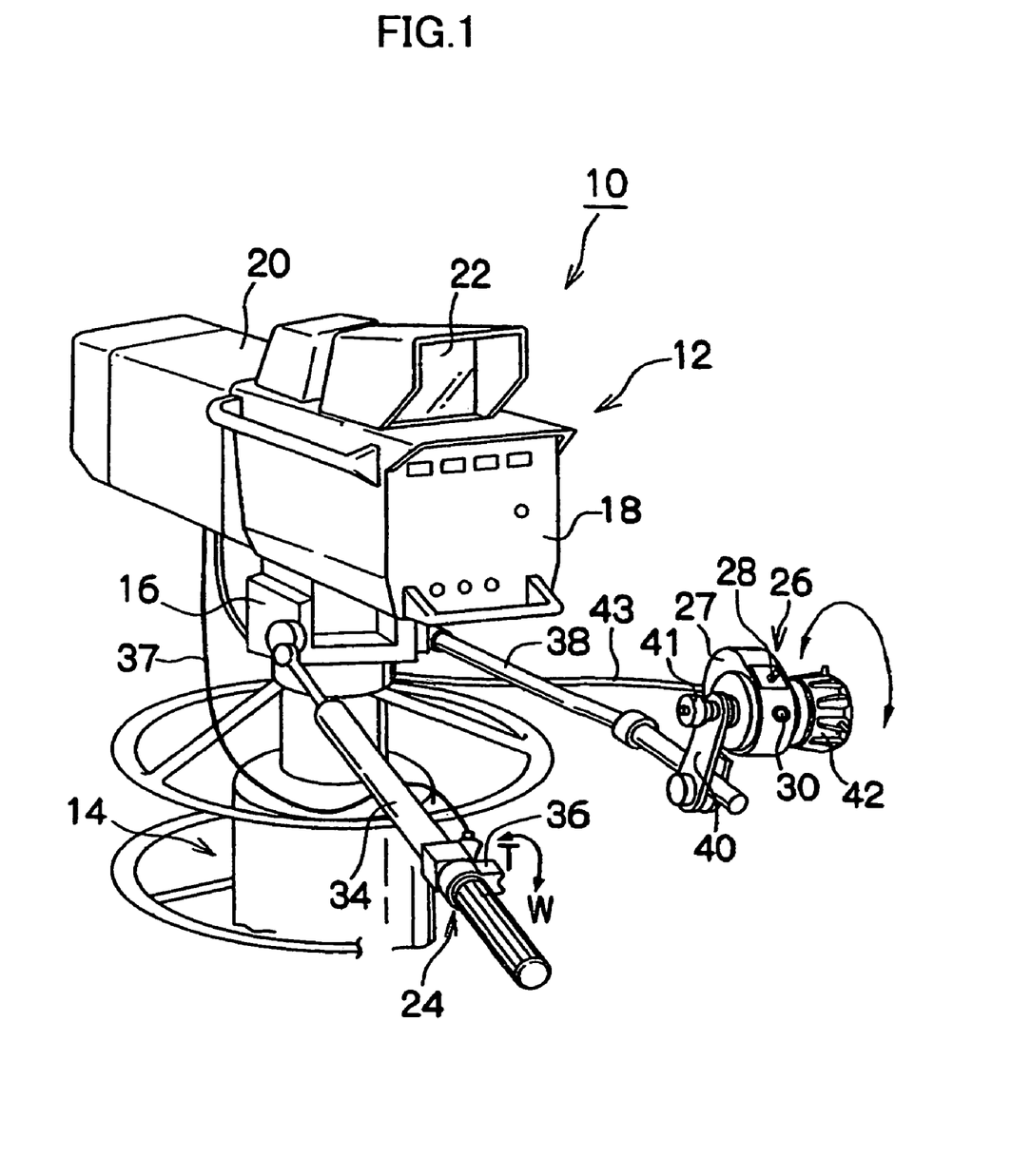
FIG. 1 is a general perspective view of a television camera system which employs a focus control apparatus according to an embodiment.
Figure 2:
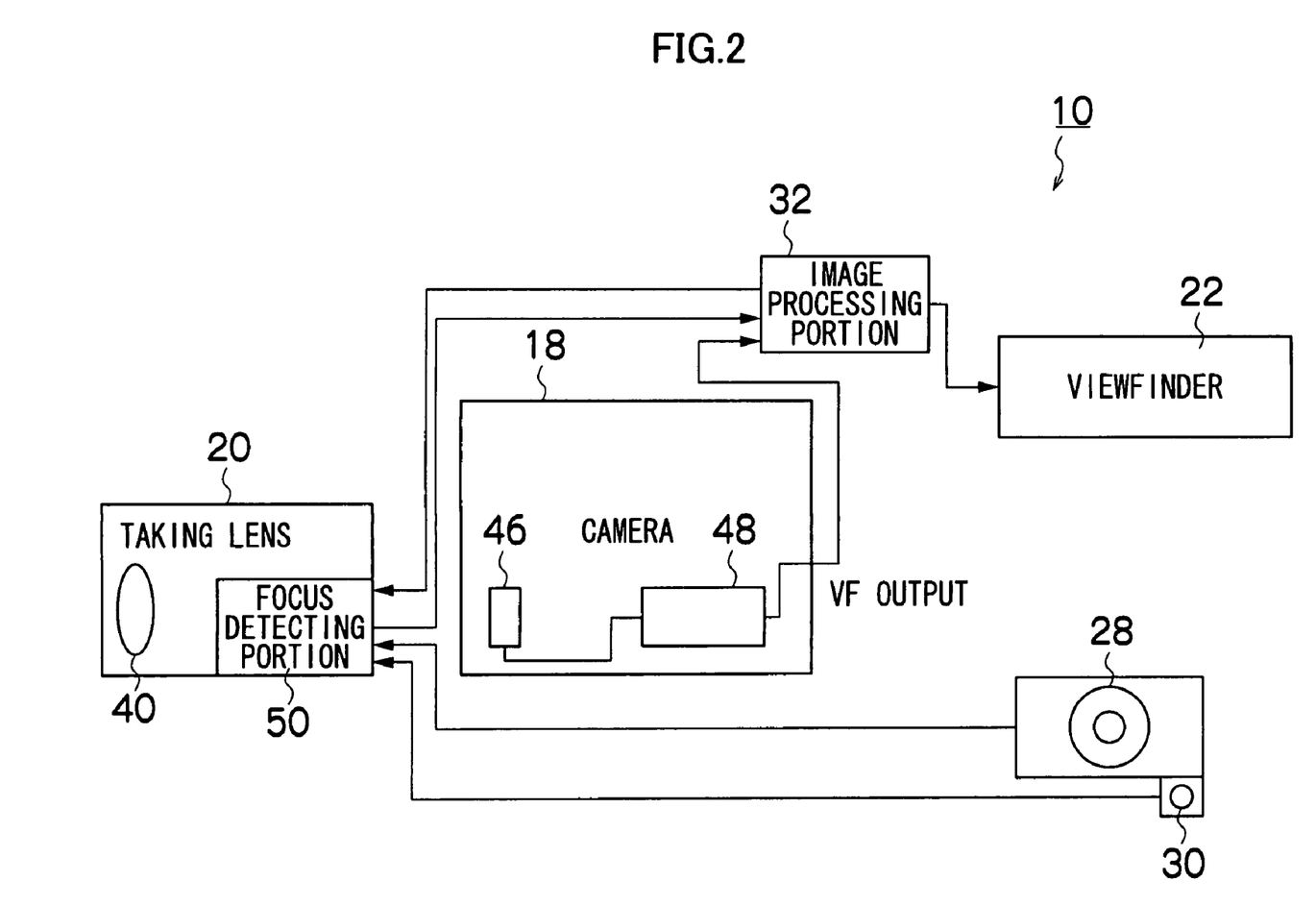
FIG. 2 is a block diagram showing a structure of the camera system shown in FIG. 1.

FIG. 1 is a general perspective view of a television camera system 10 which employs the focus control apparatus according to the present invention and FIG. 2 is a block diagram showing its configuration.

As shown in FIG. 1, the television camera system 10 according to the embodiment consists of a broadcast camera 12 mounted on a pedestal dolly 14 via a pan head 16. The broadcast camera 12 is composed of a camera body 18, taking lens 20, viewfinder 22, zoom demand 24, focus controller (focus adjusting portion) 26, etc. as well as a joystick (indicating member) 28 which is an area specifying device, a switch 30 which outputs a command signal to auto-focus on a subject in an AF area (area) specified with the joystick 28, image processing portion 32 shown in FIG. 2, etc.

As shown in FIG. 1, the zoom demand 24 is mounted on the tip of one panrod 34 extending from the pan head 16 and has a zoom lever 36 operated by the left hand of a cameraperson gripping the panrod 34. When the zoom lever 36 is turned to a W (Wide) side or T (Tele) side, a signal about the turn is outputted to a zoom lens drive circuit (not shown) of the taking lens 20 via a cable 37 and a zoom lens (not shown) is driven along a camera optical axis based on the signal, adjusting the focal length of the taking lens 20 to a desired value.

The focus controller 26 is removably mounted on the tip of another panrod 38 extending from the pan head 16, with a screw 41 via a bracket 40. It has a focus ring 42 operated by the right hand of the cameraperson. As the focus ring 42 is operated, a signal about the operation is outputted to a focus drive circuit (not shown) of the taking lens 20 via a cable 43 and a focus lens 44 in FIG. 2 is driven along a camera optical axis based on the signal, focusing the taking lens 20.

The joystick 28 and switch 30 are mounted on a body 27 of the focus controller 26. The joystick 28 and switch 30 will be described later.

As shown in FIG. 2, the camera body 18 contains an image pickup element 46 which shoots broadcast images, and light coming from a subject and forming an image via the taking lens 20 is converted into an electrical signal by the video image pickup element 46. Also, the camera body 18 contains a necessary signal processing circuit 48 which converts the electrical signal produced by the video image pickup element into a video signal in a predetermined format by the signal processing circuit 48 to represent camera images. The generated video signal is outputted from the camera body 18 or recorded on a recording medium as a recording video signal. At the same time, it is outputted to the viewfinder 22 via the image processing portion 32 so that the cameraperson can view real-time camera images being shot by the video image pickup element 46.

The taking lens 20 is equipped with a focus detecting portion 50 (not shown) to detect focus status by use of a focus-detecting image pickup element different from the video image pickup element 46. The focus detecting portion 50 detects the focus status of a subject in an AF area specified with the joystick 28 within a range of a camera image being picked up by the video image pickup element 46. Then, the focus detecting portion 50 uses the detected focus status for focus detection in auto-focusing. When the switch 30 is pressed by the cameraperson, the focus detecting portion 50 is turned on and moves the focus lens 44 of the taking lens 20 to an in-focus position based on the detected focus status to automatically focus on the subject in the specified AF area.

Figure 3:
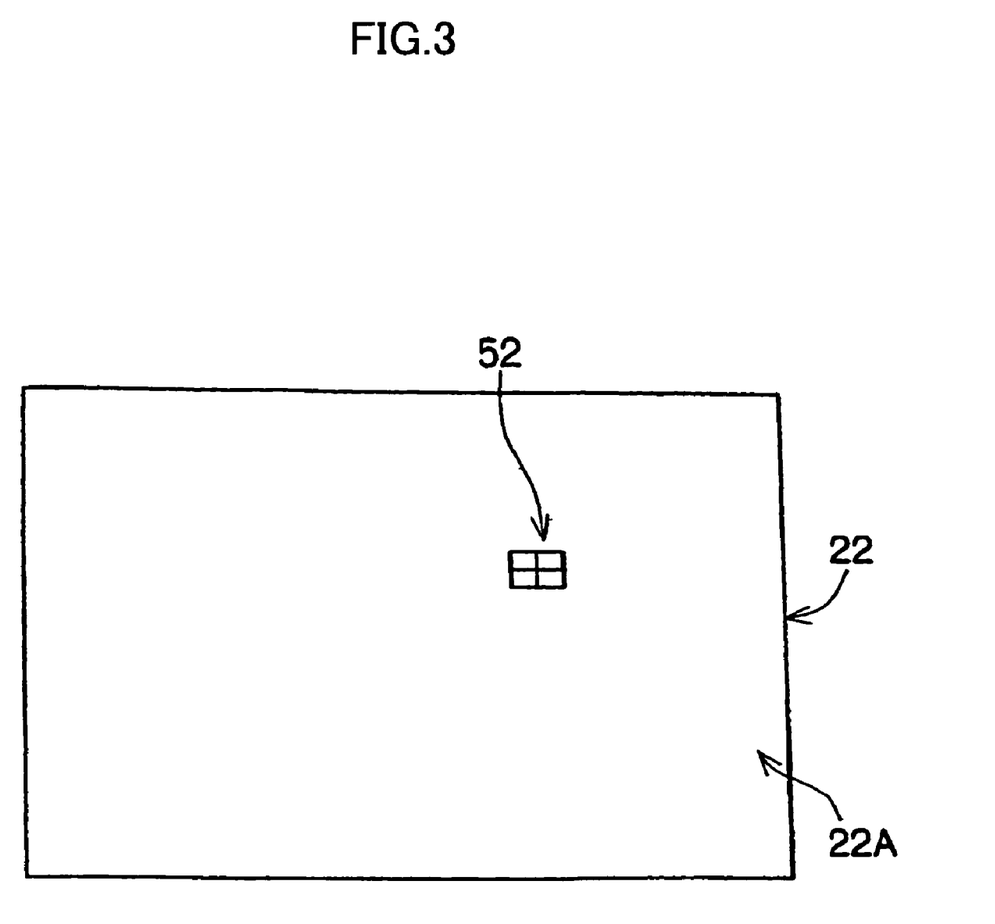
FIG. 3 is a front view of an AF frame displayed in a viewfinder.

The image processing portion 32 superimposes a mark received from the focus detecting portion 50 and indicating the AF area over camera images being shot by the video image pickup element 46 of the camera body 18 and outputs the superimposed images to the viewfinder 22. In FIG. 3, a finder screen 22A of the viewfinder 22 displays an AF frame 52 which indicates the position of the AF area. The AF frame 52 moves on the finder screen 22A of the viewfinder 22 as the cameraperson operates the joystick 28 in FIG. 1, and the area surrounded by the AF frame 52 is acquired as the position of the AF area and outputted to the focus detecting portion 50.

Figure 4:
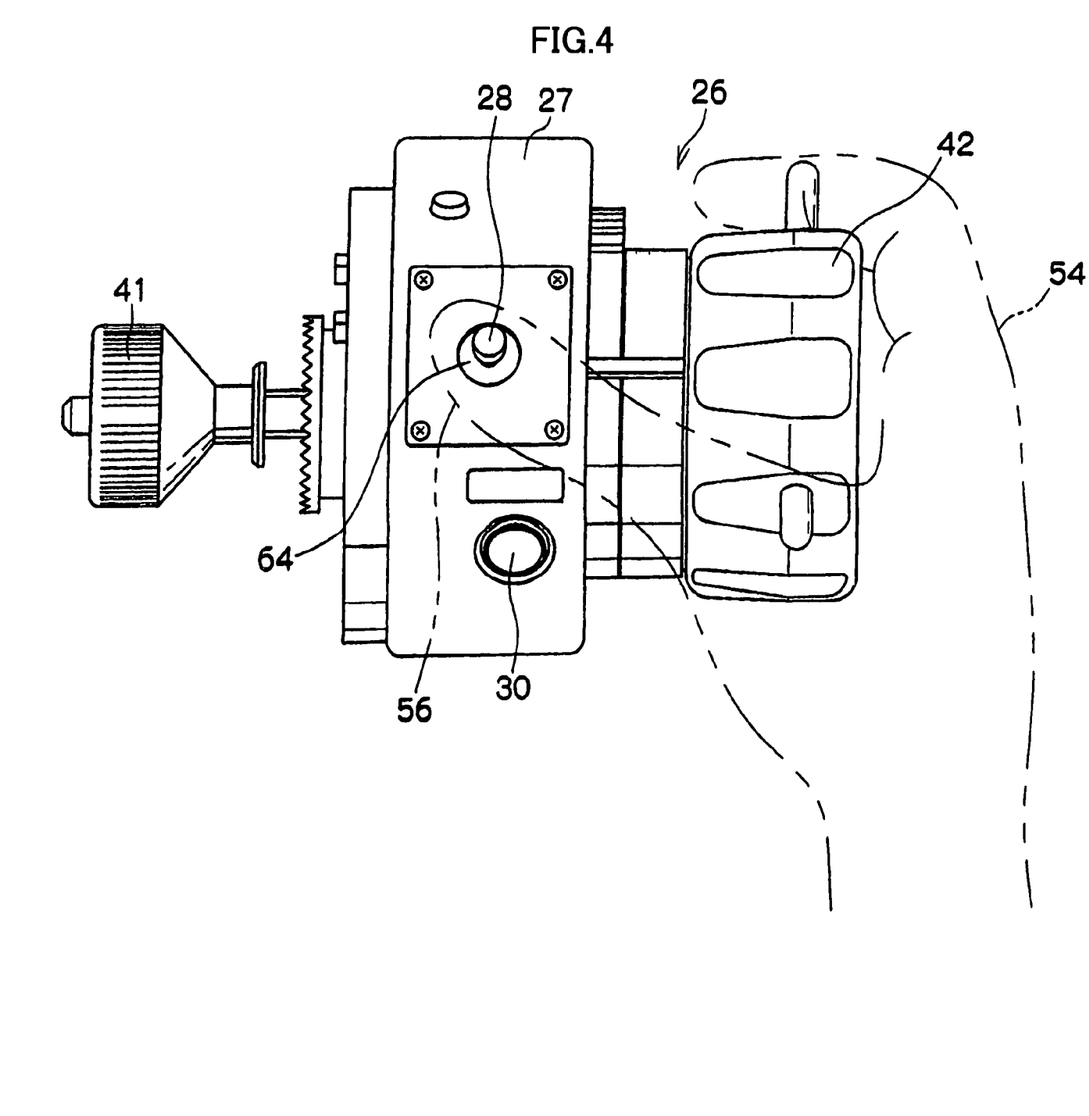
FIG. 4 is an explanatory diagram illustrating an example of a joystick mounted on a focus controller.

As shown in FIG. 4, the joystick 28 and switch 30 of the focus control apparatus according to the embodiment are mounted on an outer periphery of the body 27 of the focus controller 26 in such a position that they can be operated with the thumb 56 on the right hand 54 of the cameraperson who turns the focus ring 42 as indicated by a chain double-dashed line.

With the focus control apparatus configured as described above, to specify and focus on an AF area, the cameraperson positions the AF frame 52 on a desired AF area in the finder screen 22A by swinging the joystick 28 manually with the thumb 56 of the right hand 54. Then, the cameraperson brings the specified AF area into approximate focus by operating the focus ring 42 by the right hand 54. Subsequently, the cameraperson activates the autofocus function by pressing the switch 30 with the thumb 56 of the right hand 54. Consequently, the AF area is automatically brought into perfect focus.

Thus, in the focus control apparatus according to the embodiment, the joystick 28 and switch 30 are positioned such that they can be operated with the thumb 56 on the right hand 54 of the cameraperson who turns the focus ring 42 with the same right hand 54. Consequently, the cameraperson can operate the joystick 28 and switch 30 while turning the focus ring 42 with the right hand 54. That is, since the cameraperson can specify an AF area and adjust focus without changing the position of his/her right hand 54, he/she can specify an area and adjust focus smoothly.

Next, a structure of the joystick 28 will be described.

Figure 5:
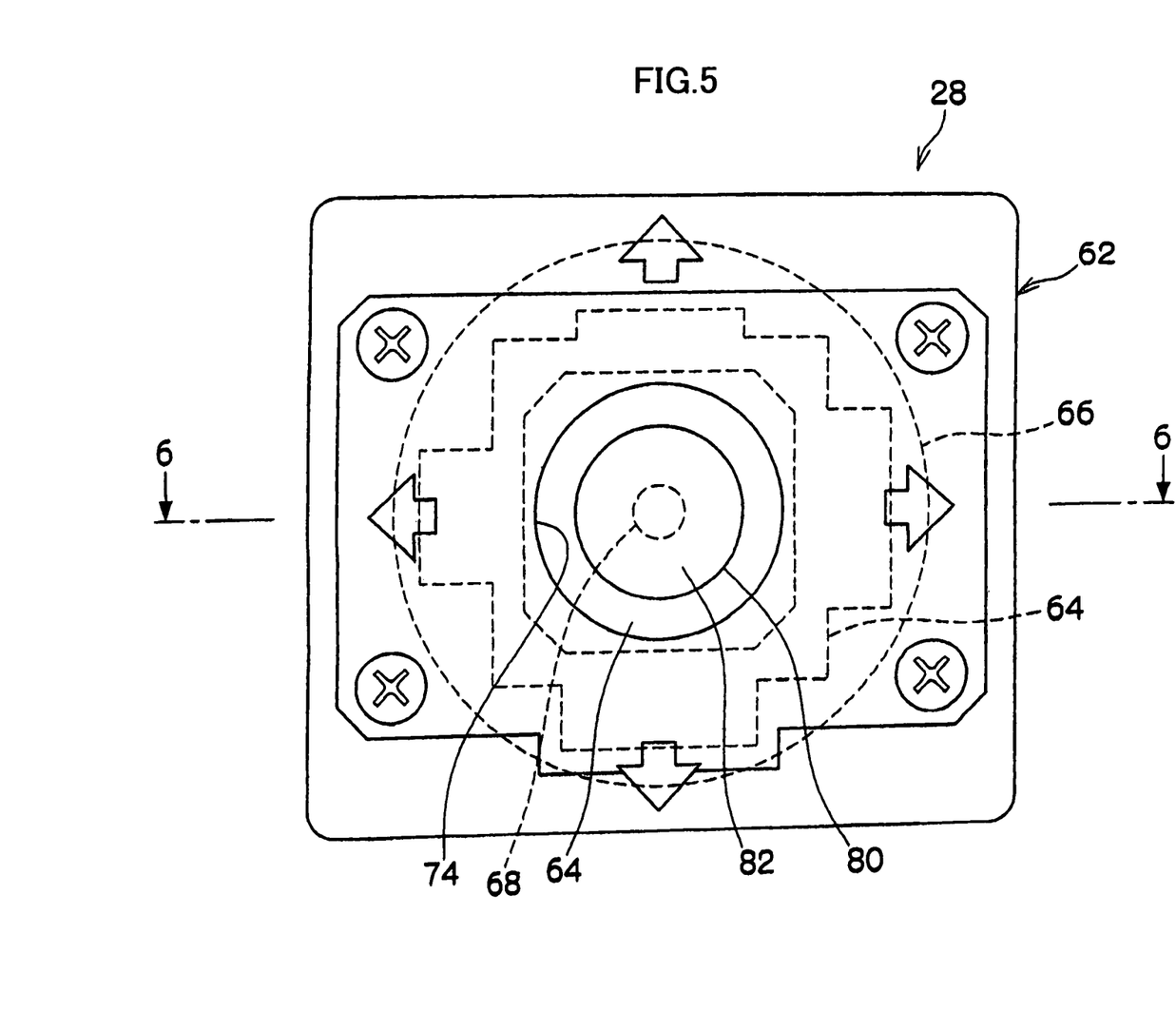
FIG. 5 is a top view of the joystick.
Figure 6:
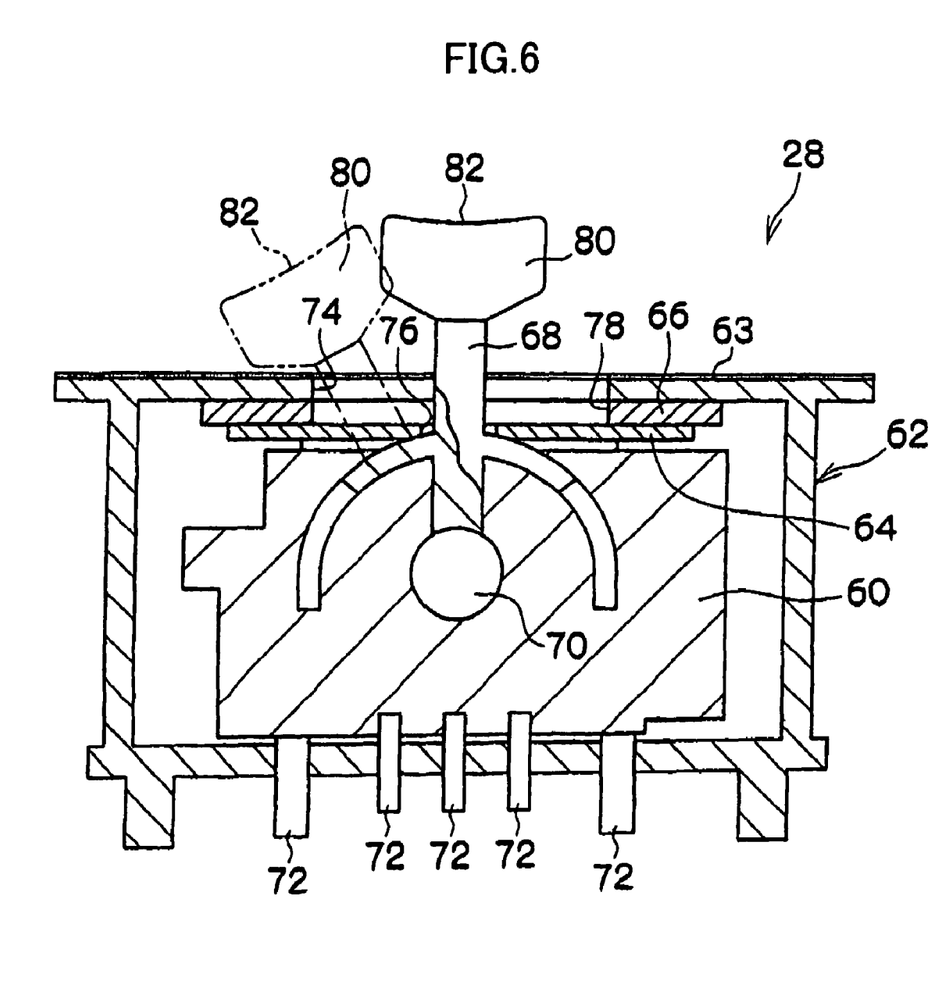
FIG. 6 is a longitudinal sectional view of the joystick along line 6-6 in FIG. 5.

FIG. 5 is a top view of the joystick 28 and FIG. 6 is a longitudinal sectional view along line 6-6 in FIG. 5.

As shown in FIGS. 5 and 6, the joystick 28 consists of a joystick body 60, casing 62, sliding plate (sliding member) 64, and friction plate (friction member) 66. The joystick body 60 has a lever 68 swingably mounted via a spherical bearing 70 and has connectors 72 to output a signal corresponding to a swing motion of the lever 68. The casing 62 is a housing which houses the joystick body 60. A top board 63 of the casing 62 has an opening 74 which allows the lever 68 to stick out and perform the swing motion. On the other hand, the sliding plate 64 is large enough to cover the opening 74 in the casing 62 and has a hole 76 in the center for the lever 68 to pass through. The sliding plate 64 can slide between the casing 62 and joystick body 60 along with the swing motion of the lever 68. The friction plate 66 is fixed to the undersurface of the top board 63 of the casing 62 and gives a predetermined frictional force to the sliding plate 64 it faces, being placed in contact with the sliding plate 64. Besides, the friction plate 66 also has an opening 78 which allows the lever 68 to stick out and perform the swing motion.

In many cases, the joystick 28 used as an AF area specifying device is a center return type. In that case, as the cameraperson lifts his/her thumb off the lever 68 of the joystick 28 after specifying an area, the lever 68 automatically returns to the center. This can cause a deviation in the specified area.

To deal with this problem as well as to give an appropriate feel, the sliding plate 64 and the friction plate 66 are mounted on the joystick 28 as shown in FIG. 6 to brake the sliding plate 64 by the frictional resistance between the sliding plate 64 and friction plate 66 and thereby prevent the lever 68, by use of the hole 76, from deviating from its course. This makes it possible to prevent deviation of the area specified with the joystick 28.

Since the joystick body 60 contains encoders and other electrical components which do not like dust and water droplets, it is necessary to prevent intrusion of dust and water droplets into the joystick body 60. According to the embodiment, since the opening 74 in the top board 63 through which dust and water droplets can intrude is normally covered by the sliding plate 64, no dust or water droplet will intrude the joystick body 60.

Also, according to the embodiment, a knob 80 at the top end of the lever 68 of the joystick 28 has an approximately flat concave spherical top face 82.

Typical joysticks, which have a spherical knob on the lever, are disadvantageous in that a thumb operating the knob tends to slip over the spherical surface, thus making it difficult to specify an area in a stable manner. When the knob 80 has an approximately flat concave spherical top face 82 as shown in FIG. 6, the side of the thumb contacts the top face of the knob more closely, making it possible to specify an area in a stable manner. Incidentally, similar effect can be produced when the top face 82 of the knob 80 is flat.

Figure 7:
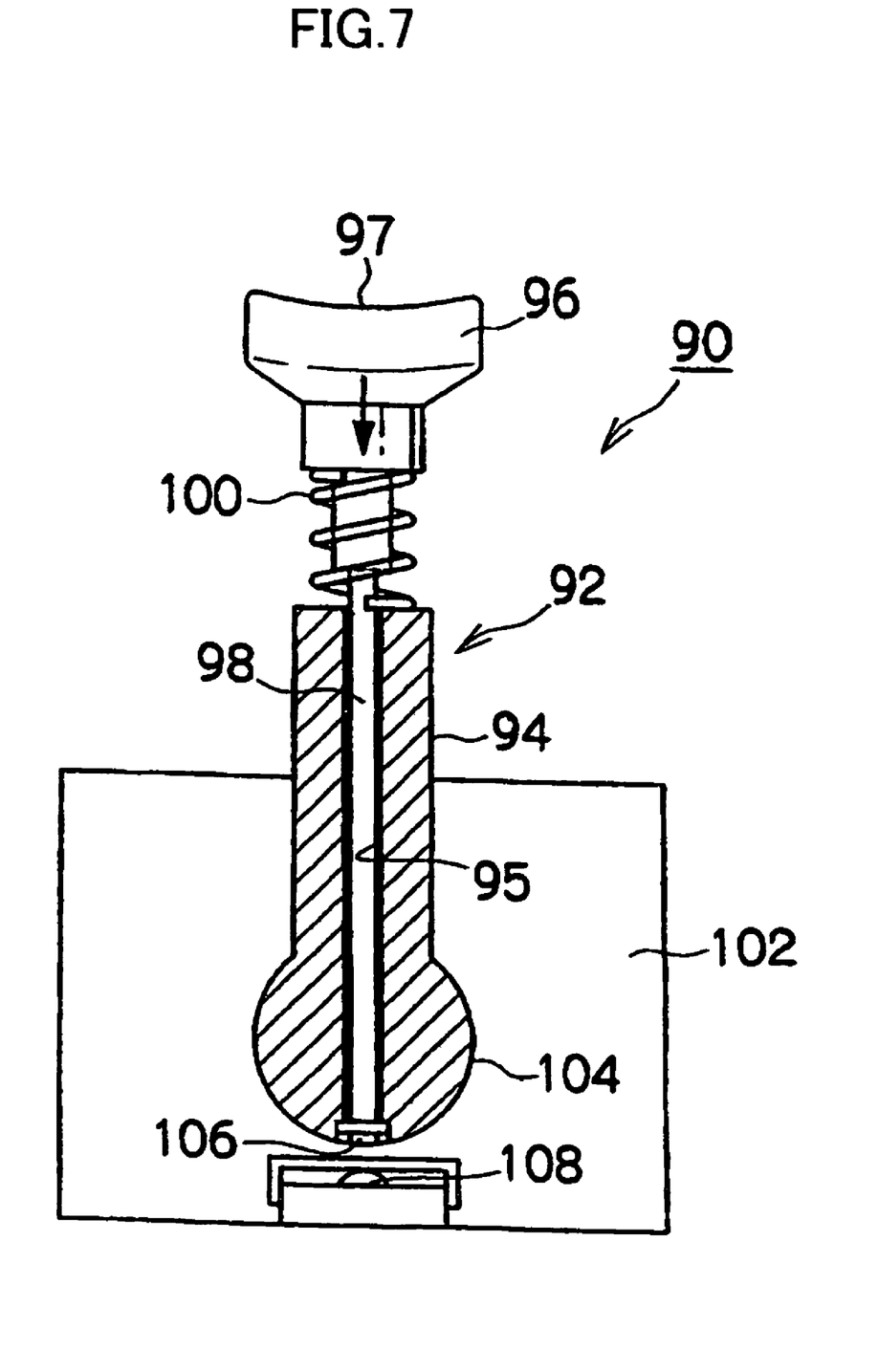
FIG. 7 is a sectional view showing another embodiment of a joystick.

FIG. 7 is a sectional view of the essence of a joystick according to another embodiment, where a lever 92 of a joystick 90 has a function of the switch 30 (FIG. 4).

The lever 92 in FIG. 7 consists of a lever body 94, knob 96, pin 98, and spring 100. The lever body 94 is formed into a tubular shape and swingably mounted on a joystick body 102 via a spherical bearing 104. The pin 98 is fixed to the bottom of the knob 96 and passed into a hollow part 95 of the lever body 94. A pressing plate 106 formed at the bottom of the pin 98 is placed in opposing relation to a microswitch 108 contained in the joystick body 102. The spring 100 is interposed between the lever body 94 and knob 96, biasing the knob 96 upward in FIG. 7. Thus, when the knob 96 is pressed down against the biasing force of the spring 100, the pin 98 lowers, causing the pressing plate 106 to press the microswitch 108. Consequently, the microswitch 108 is turned on and outputs a command signal. In this way, as a switch function is incorporated into the knob 96 of the joystick 90 and a command signal is outputted by a press of the knob 96, the cameraperson can press the knob 96 without lifting his/her thumb off the lever 92 after specifying an AF area by swinging the knob 96, and thus can perform a sequence of operations from specification of the AF area to adjustment of focus at once. Incidentally, the knob 96 also has an approximately flat concave spherical top face 97. Alternatively, the function of the switch 30 may be provided directly on the top face 97 of the knob 96.

Figure 8:
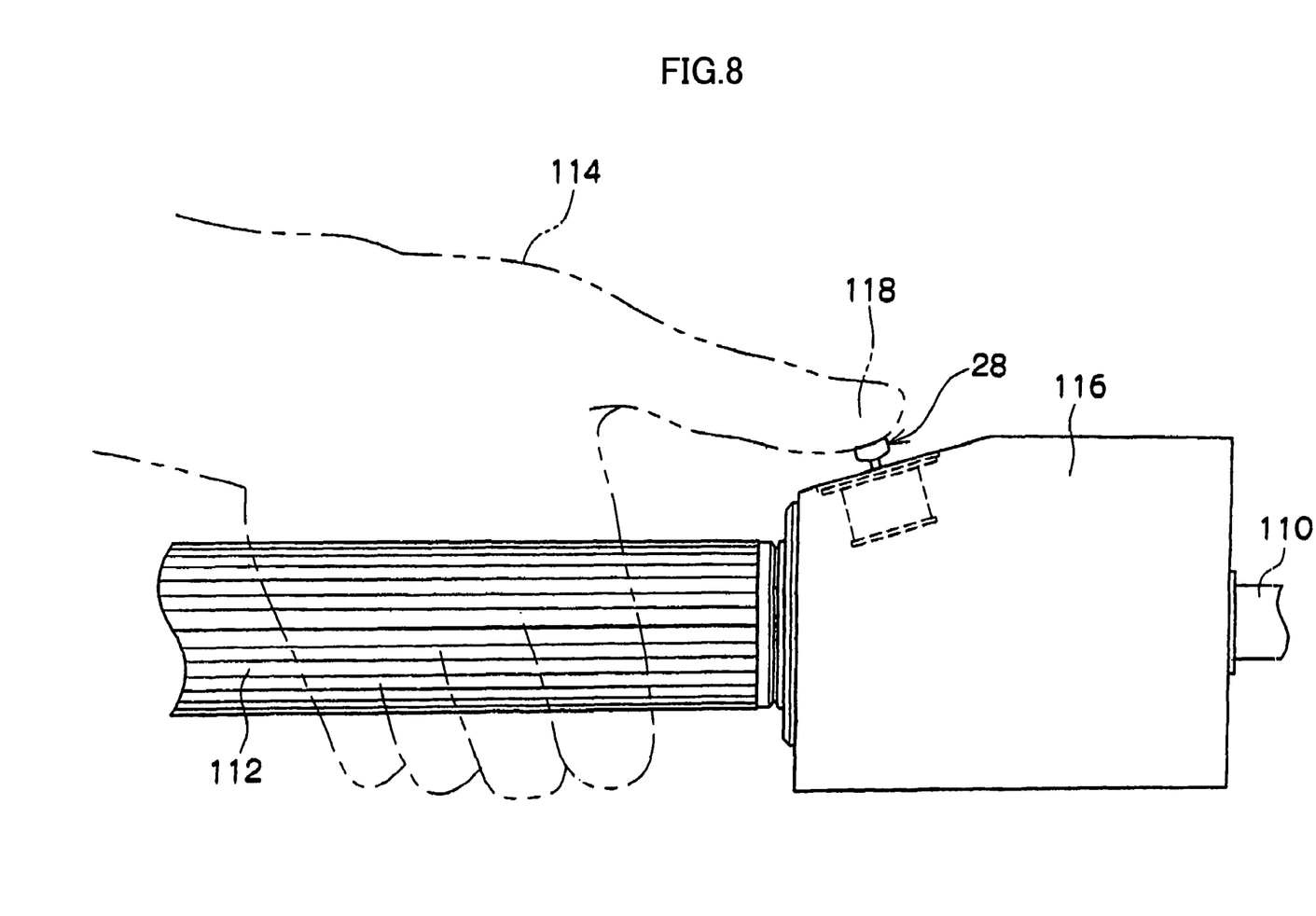
FIG. 8 is a side view of the essence of the focus control apparatus mounted on a grip of a panrod.

FIG. 8 shows a focus controller in which a grip 112 connected to an end of a panrod 110 combines a focus ring. The cameraperson holds the grip 112 with his/her right hand 114 and turns it to focus the camera. A focus control apparatus is fastened to a connecting portion between the grip 112 and panrod 110.

Figure 9:
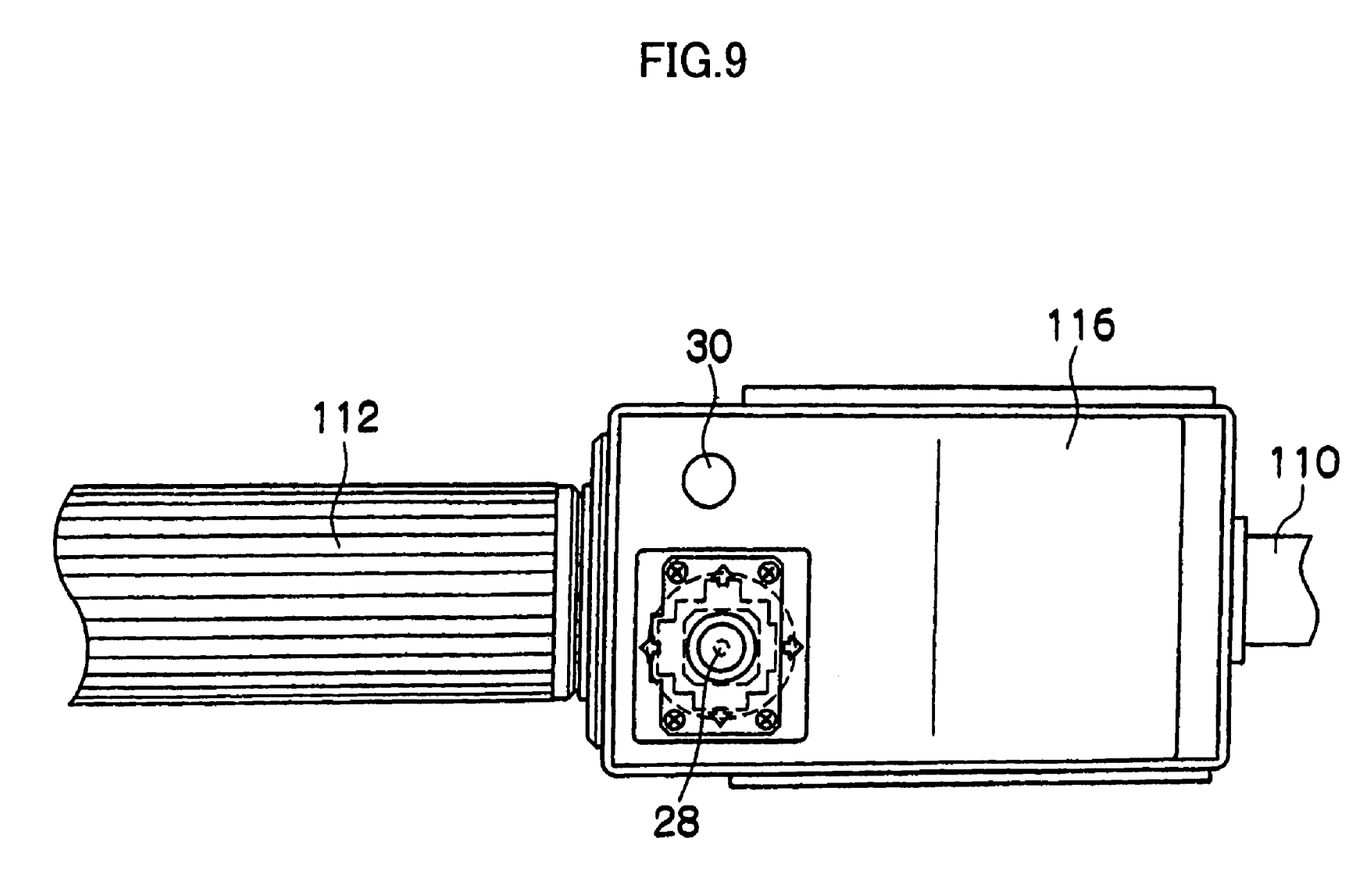
FIG. 9 is top view of the focus control apparatus shown in FIG. 8.

In the focus control apparatus, as shown in FIG. 9, the joystick 28 and switch 30 are mounted on a body housing 116 fastened to the panrod 110 and are positioned such that they can be operated with the thumb 118 on the hand 114 of the cameraperson holding the grip 112.

With the focus control apparatus of this type again, since the cameraperson can operate the joystick 28 and switch 30 while turning the grip 112 with his/her hand 114, he/she can specify an AF area and adjust focus without taking his/her hand 114 off the grip 112. Consequently, he/she can specify an area and adjust focus smoothly.

What is claimed is:

1. A focus control apparatus for a television camera comprising:
   a focus ring of a focus controller for manual focus adjustment of the television camera;
   an indicating member for use to specify an area desired to be brought into focus within a range of a camera image being picked up by the television camera;
   an area display device which displays position of the area specified with the indicating member, on a camera screen; and
   a switch which outputs a command signal to auto-focus on a subject in the area specified with the indicating member,
   wherein the indicating member and the switch are positioned at the outer periphery of the body of the focus controller in such a position that the indicating member and the switch can be operated simultaneously with the focus ring by the same hand; and
   wherein the indicating member includes:
      an indicating member body which outputs a signal corresponding to a swing motion of a lever of the indicating member;
      a casing which houses the indicating member body, makes the lever stick out, and has an opening to permit the swing motion of the lever;
      a sliding member which covers the opening in the casing, has a hole for the lever to pass through, and slides between the casing and the indicating member body along with moement of the lever; and
      a friction member which gies a predetermined frictional force to the sliding member, being mounted on the casing and placed in contact with the sliding member.

2. The focus control apparatus according to claim 1, wherein a knob with an approximately flat concae spherical top face or a flat top face is attached to the lever of the indicating member.

3. A focus control apparatus for a television camera comprising:
   a focus ring of a focus controller for focus adjustment of the television camera;
   an indicating member for use to specify an area desired to be brought into focus within a range of a camera image being picked up by the television camera;
   an area display deice which displays position of the area specffied with the indicating member, on a camera screen; and
   a switch which outputs a command signal to auto-focus on a subject in the area specified with the indicating member, wherein the switch is a switch mechanism which is mounted on the indicating member and outputs the command signal; and
   wherein the indicating member includes:
      an indicating member body which outputs a signal corresponding to a swing motion of a lever of the indicating member;
      a casing which houses the indicating member body, makes the lever stick out, and has an opening to permit the swing motion of the lever;
      a sliding member which coers the opening in the casing, has a hole for the lever to pass through, and slides between the casing and the indicating member body along with moement of the lever; and
      a friction member which gies a predetermined frictional force to the sliding member, being mounted on the casing and placed in contact with the sliding member.

* * * * *